US010851711B2

(12) United States Patent
Schaedler et al.

(10) Patent No.: US 10,851,711 B2
(45) Date of Patent: Dec. 1, 2020

(54) THERMAL BARRIER COATING WITH TEMPERATURE-FOLLOWING LAYER

(71) Applicant: GM GLOBAL TECHNOLOGY OPERATIONS LLC, Detroit, MI (US)

(72) Inventors: Tobias A Schaedler, Oak Park, CA (US); Sloan Smith, Moorpark, CA (US); Christine M Lihn, Culver City, CA (US); Scott M Biesboer, Malibu, CA (US); Russell P Durrett, Bloomfield Hills, MI (US); Peter P Andruskiewicz, IV, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 15/852,172

(22) Filed: Dec. 22, 2017

(65) Prior Publication Data

US 2019/0195126 A1 Jun. 27, 2019

(51) Int. Cl.

*F02B 77/00* (2006.01)
*B32B 3/00* (2006.01)
*F02B 77/11* (2006.01)
*C23C 4/11* (2016.01)
*C23C 4/134* (2016.01)

(Continued)

(52) U.S. Cl.

CPC ................ *F02B 77/11* (2013.01); *C23C 4/11* (2016.01); *C23C 4/129* (2016.01); *C23C 4/134* (2016.01); *C23C 18/32* (2013.01)

(58) Field of Classification Search

None

See application file for complete search history.

(56) References Cited

U.S. PATENT DOCUMENTS 3,047,938 A 8/1962 Dega
3,674,461 A 7/1972 Farnand et al.

(Continued)

FOREIGN PATENT DOCUMENTS

CN 104018139 4/2016
DE 112013004121 T5 4/2015

(Continued)

OTHER PUBLICATIONS

U.S. Appl. No. 15/730,531 "Multi-Layer Thermal Barrier," filed Oct. 11, 2017 by GM Global Technology Operations LLC.

(Continued)

*Primary Examiner* — Humera N. Sheikh
*Assistant Examiner* — Mary I Omori

(57) ABSTRACT

A temperature-following layer may be applied to a surface of components within an internal combustion engine. The temperature-following layer follows the temperature swing of adjacent gases (for example, in a combustion chamber). The temperature-following layer may be applied directly to a substrate, or the temperature-following layer may be an outer layer of a multi-layer thermal barrier coating. The multi-layer thermal barrier coating may include, for example, an insulating layer, a sealing layer bonded to the insulating layer, and a porous temperature-following layer disposed on the sealing layer. The sealing layer is substantially non-permeable and configured to seal against the insulating layer.

17 Claims, 6 Drawing Sheets

(51) Int. Cl.
*C23C 4/129* (2016.01)
*C23C 18/32* (2006.01)

(56) References Cited

U.S. PATENT DOCUMENTS

| | | | |
|---|---|---|---|
| 3,769,770 | A | 11/1973 | Deschamps et al. |
| 4,303,737 | A | 12/1981 | Litchfield et al. |
| 4,423,097 | A | 12/1983 | Mons et al. |
| 4,775,598 | A | 10/1988 | Jaeckel |
| 5,305,726 | A | 4/1994 | Scharman et al. |
| 5,492,870 | A | 2/1996 | Wilcox et al. |
| 6,071,628 | A | 6/2000 | Seals et al. |
| 6,162,310 | A | 12/2000 | Tseng |
| 6,196,529 | B1 | 3/2001 | Shtarkman et al. |
| 6,210,791 | B1 | 4/2001 | Skoog et al. |
| 6,245,390 | B1 | 6/2001 | Baranovski et al. |
| 6,828,026 | B2 | 12/2004 | Bretschneider et al. |
| 6,916,529 | B2 | 7/2005 | Pabla et al. |
| 6,939,603 | B2 | 9/2005 | Oeschner |
| 7,582,362 | B2 | 9/2009 | Fiala et al. |
| 7,666,807 | B2 | 2/2010 | Heung et al. |
| 8,371,256 | B2 | 2/2013 | Durrett et al. |
| 8,568,538 | B2 | 10/2013 | Kerber |
| 8,607,566 | B2 | 12/2013 | Durrett et al. |
| 8,616,162 | B2 | 12/2013 | Najt et al. |
| 8,646,421 | B2 | 2/2014 | Durrett et al. |
| 8,714,117 | B2 | 5/2014 | Gopalakrishnan et al. |
| 8,729,717 | B2 | 5/2014 | Durrett et al. |
| 8,893,693 | B2 | 11/2014 | Hijii et al. |
| 9,080,508 | B2 | 7/2015 | Durrett et al. |
| 9,096,763 | B2 | 8/2015 | Belov et al. |
| 9,574,491 | B2 | 2/2017 | Durrett et al. |
| 9,677,464 | B2 | 6/2017 | Durrett et al. |
| 9,719,176 | B2 | 8/2017 | Schaedler et al. |
| 9,738,778 | B2 | 8/2017 | Fantinel et al. |
| 9,897,000 | B2 | 2/2018 | Durrett et al. |
| 10,040,723 | B2 | 8/2018 | Durrett et al. |
| 2003/0077473 | A1 | 4/2003 | Bretschneider et al. |
| 2006/0065330 | A1 | 3/2006 | Cooper et al. |
| 2007/0209317 | A1 | 9/2007 | Jensen |
| 2010/0242477 | A1* | 9/2010 | Duval ........................ C23C 4/18 60/645 |
| 2013/0199492 | A1 | 8/2013 | Gopalakrishnan et al. |
| 2015/0196545 | A1 | 7/2015 | Aftab et al. |
| 2016/0022872 | A1 | 1/2016 | Wells et al. |
| 2016/0194762 | A1* | 7/2016 | Schaedler ............... C23C 26/00 428/220 |
| 2016/0376980 | A1 | 12/2016 | Du et al. |
| 2017/0234216 | A1 | 8/2017 | Durrett et al. |
| 2017/0274456 | A1 | 9/2017 | Walker et al. |
| 2018/0038276 | A1 | 2/2018 | Durrett et al. |
| 2018/0038308 | A1 | 2/2018 | Durrett et al. |
| 2018/0179623 | A1 | 6/2018 | Walker |
| 2018/0185876 | A1 | 7/2018 | Walker |
| 2018/0186144 | A1 | 7/2018 | Durrett et al. |
| 2019/0194812 | A1* | 6/2019 | Walker .................. C23C 28/022 |

FOREIGN PATENT DOCUMENTS

| | | | |
|---|---|---|---|
| JP | H02305970 | 12/1990 | |
| JP | 2003113737 | 4/2003 | |
| JP | 2009243352 | 10/2009 | |
| WO | 2009020206 | 2/2009 | |
| WO | 2013038249 | 3/2013 | |
| WO | 2015019145 | 2/2015 | |
| WO | 2015042491 | 3/2015 | |
| WO | 2015110379 | 7/2015 | |
| WO | WO-2016153543 A2 * | 9/2016 | ........... C04B 41/009 |

OTHER PUBLICATIONS

Kawaguchi, Tateno, Yamashita, Tomoda, Nishikawa, Yamashita, Wakisaka, Nakakita, "Toyota's Innovative Thermal Management Approaches—Thermo Swing Wall Technology," 24th Aachen Colloquium Automobile and Engine Technology 2015; pp. 391-414.
Solorzano et al., "Thermal Properties of Hollow Spheres," Multifunctional Metallic Hollow Sphere Struct., pp. 89-107 (2009).
Kosaka et al., "Concept of Temperature Swing Heat Insulation in Combustion Chamber Walls and Appropriate Thermophysical Properties for Heat Insulation Coat," SAE Int. J. Engines vol. 6, Issue 1, p. 142 (2013).
Göhler et al., "Metallic Hollow Sphere Structures—Status and Outlook," CellMat 2010 Conference Proceedings, pp. 1-9.
U.S. Appl. No. 15/849,883, "Gap-Filling Sealing Layer of Thermal Barrier Coating," filed Dec. 21, 2017 by GM Global Technology Operations LLC.
German Office Action for application No. 10 2018 133 001.4 dated Jul. 30, 2019, 7 pages.

* cited by examiner

THERMAL BARRIER COATING WITH TEMPERATURE-FOLLOWING LAYER

TECHNICAL FIELD

The disclosure relates generally to a thermal barrier layers, which may be referred to as thermal barrier coatings (TBCs), for protecting components subject to high-temperature gasses.

INTRODUCTION

Internal combustion engines include a plurality of cylinders, a plurality of pistons, at least one intake port, and at least one exhaust port. The cylinders each include surfaces that define a combustion chamber. One or more surfaces of the internal combustion engine may be coated with thermal barrier coatings, or multi-layer thermal barriers, to improve the heat transfer characteristics of the internal combustion engine and minimize heat loss within the combustion chamber.

For example, such a coating system is desired for insulating the hot combustion gasses from the cold, water-cooled engine block, to avoid energy loss by transferring heat from the combustion gasses to the cooling water. In addition, during the intake cycle, the surface of the coating system should cool down rapidly to avoid heating up the fuel-air mixture before ignition to avoid knocking.

SUMMARY

The present disclosure provides a temperature-following top layer applied to a component or other layer that swings with the temperature of the adjacent gas. Thus, the temperature-following layer helps to reduce heat transfer losses without affecting the engine's breathing capability and without causing knock.

In one form, a thermal barrier coating is provided that may be applied to a surface of one or more components within an internal combustion engine. The thermal barrier coating is bonded to the component(s) of the engine to provide low thermal conductivity and low heat capacity insulation that is sealed against combustion gasses. In cases where the thermal barrier coating has multiple layers, the temperature-following layer is disposed on the outermost surface of the multi-layer thermal barrier coating.

The thermal barrier coating, or multi-layer thermal barrier coating, may include one, two, three, four, or more layers, bonded to one another, e.g., an insulating layer, a sealing layer, and a temperature-following layer. The sealing layer is disposed between the insulating layer and the temperature-following layer. A bonding layer may also be provided under the insulating layer, in which case, the insulating layer would be disposed between the bonding layer and the sealing layer. The innermost layer (which could be the bonding layer, the insulating layer, the sealing layer, or the temperature-following layer, depending on which layers are included) is bonded to the component.

The thermal barrier coating has a low thermal conductivity to reduce heat transfer losses and a low heat capacity so that the surface temperature of the thermal barrier coating tracks the gas temperature in the combustion chamber. Thus, the thermal barrier coating allows surface temperatures of the component to swing with the gas temperatures. This reduces heat transfer losses without affecting the engine's breathing capability and without increasing knocking tendency. Further, heating of cool air entering the cylinder of the engine is reduced. Additionally, exhaust temperature is increased, resulting in faster catalyst light off time and improved catalyst activity.

In one form, which may be combined with or separate from the other forms described herein, a multi-layer thermal barrier coating is provided that includes at least an insulating layer, a sealing layer, and a temperature-following layer. The sealing layer is bonded to the insulating layer, the sealing layer being substantially non-permeable and configured to seal against the insulating layer. The temperature-following layer is porous and is disposed on the sealing layer. The temperature-following layer has an exposed edge. The temperature-following layer is configured to follow a temperature of a gas adjacent to the exposed edge.

In another form, which may be combined with or separate from the other forms disclosed herein, a component is provided that includes a substrate and a porous temperature-following layer disposed on the substrate. The temperature-following layer has an exposed edge. The temperature-following layer is configured to follow a temperature of a gas adjacent to the exposed edge, and the temperature-following layer is at least 90% porous.

Further additional features may be provided, including but not limited to the following: the temperature-following layer being at least 90% porous; the temperature-following layer being at least 98% porous; the temperature-following layer being substantially comprised of nickel; the temperature-following layer having a height in the range of 10 to 300 microns; the temperature-following layer having a height not greater than 50 microns; the sealing layer having a height in the range of 0 to 50 microns or 3 to 50 microns; the insulating layer having a height in the range of 50 to 500 microns; the insulating layer having a height not greater than 250 microns; the sealing layer being no more than 10% porous; the insulating layer comprising a ceramic material such as zirconia, stabilized zirconia, alumina, silica, rare earth aluminates, oxide perovskites, oxide spinels, and/or titanates; the insulating layer having a porosity in the range of 10% to 90%; and the insulating layer comprising a plurality of hollow microstructures bonded together.

Further additional features may be provided, including but not limited to the following: the temperature-following layer comprising a plurality of hollow microstructures bonded together; the plurality of hollow microstructures being formed of ceramic and/or metal; each hollow microstructure having an outer diameter in the range of 10 to 100 microns; at least a portion of the hollow microstructures of the temperature-following layer each having an outer wall, the outer wall defining an opening therein; the opening being disposed on an outer side of the temperature-following layer; each hollow microstructure being porous; the temperature-following layer comprising a plurality of pillars; the pillars each having a height in the range of 10 to 100 microns; the pillars having a width in the range of 1/1000 to 1/20 of the height; each pillar being substantially straight along its height; the temperature-following layer comprising a fibrous structure; the temperature-following layer comprising structures forming a plurality of pockets; the structures defining open ends of the pockets along an outer side of the temperature-following layer; the temperature-following layer comprising an open cell honeycomb structure; the temperature-following layer comprising structures defining gas-trapping pockets; wherein the gas-trapping pockets have open ends; wherein the gas-trapping pockets have portions forming outer walls over the gas-trapping pockets.

Furthermore, a component comprising a metal substrate presenting a surface may be provided, with a version of the thermal barrier coating, or only the temperature-following layer, being bonded to the surface of the substrate. The component may be a valve face or a piston crown, by way of example. In addition, the present disclosure contemplates an internal combustion engine comprising such a component having any version of the thermal barrier coating disposed thereon or bonded thereto, wherein the component is configured to be subjected to combustion gasses.

The above features and advantages and other features and advantages of the present teachings are readily apparent from the following detailed description for carrying out the present teachings when taken in connection with the accompanying drawings.

BRIEF DESCRIPTION OF THE DRAWINGS

The drawings described herein are for illustration purposes only and are not intended to limit the scope of the present disclosure in any way.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
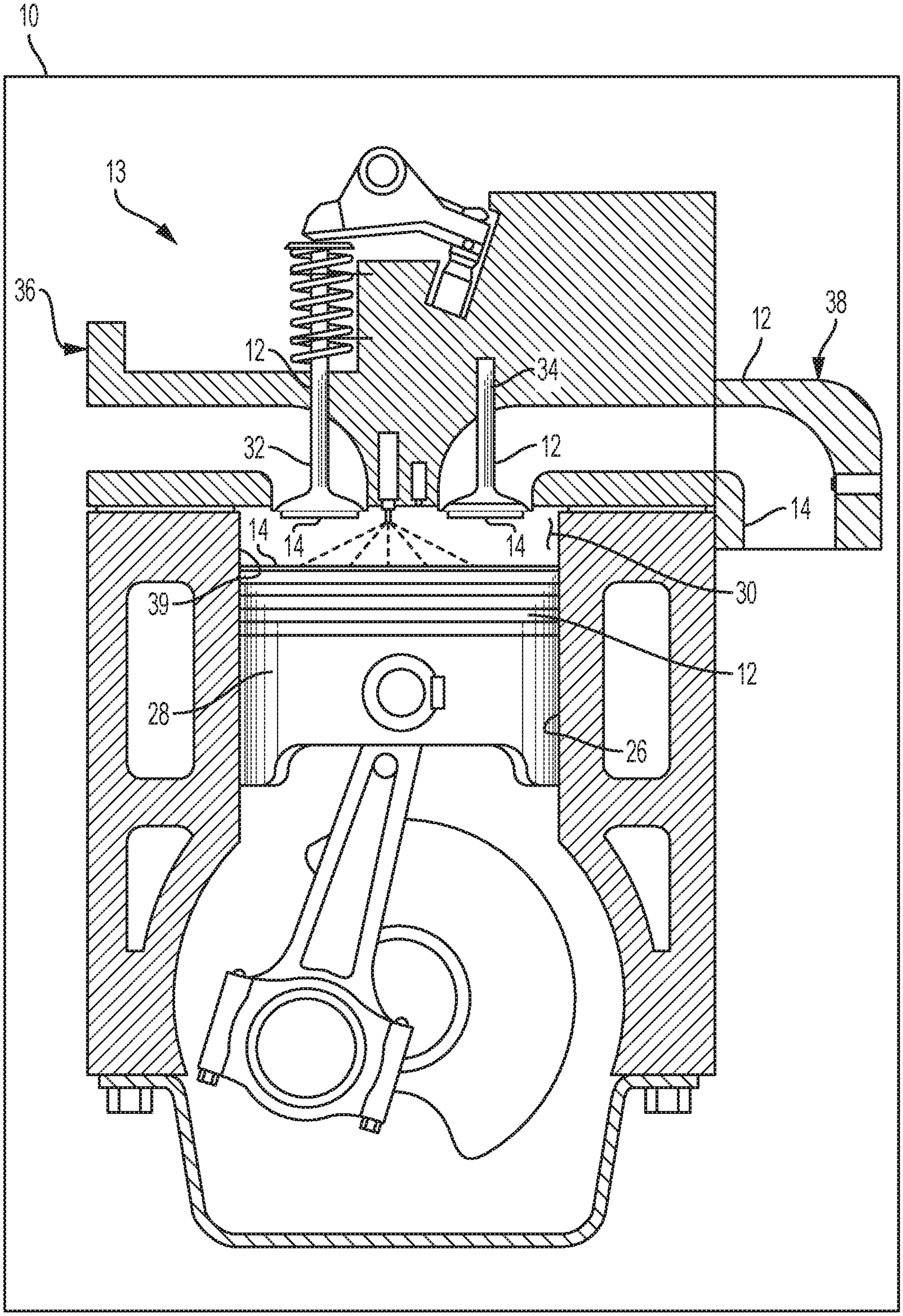
FIG. 1 is a schematic side cross-sectional view of a portion of a propulsions system having a single cylinder of an internal combustion engine including a thermal barrier coating disposed on a plurality of components, in accordance with the principles of the present disclosure.

Referring to the drawings, wherein like reference numbers refer to like components throughout the views, FIG. 1 shows a portion of an example vehicle propulsion system 10 that includes an engine 13 having a component 12. The component 12 has a thermal barrier "coating" (TBC) 14 of the type disclosed herein, applied thereto. The thermal barrier coating 14 may be referred to as a composite thermal barrier coating or multi-layer thermal barrier in forms that have multiple layers bonded together. For example, the TBC 14 may be an engineered surface comprised of a plurality of layers, which is described in further detail below.

While the engine 13 of FIG. 1 is a typical example application suitable for the thermal barrier coating 14 disclosed herein, the present design is not limited to vehicular and/or engine applications. Stationary or mobile, machine or manufacture, in which a component thereof is exposed to heat, may benefit from use of the present design.

FIG. 1 illustrates an engine 13 defining a single cylinder 26. However, those skilled in the art will recognize that the present disclosure may also be applied to components 12 of engines 13 having multiple cylinders 26. Each cylinder 26 defines a combustion chamber 30. The engine 13 is configured to provide energy for the propulsion system 10 of the vehicle. The engine 13 may include but is not limited to a diesel engine or a gasoline engine.

The engine 13 further includes an intake assembly 36 and an exhaust manifold 38, each in fluid communication with the combustion chamber 30. The engine 13 includes a reciprocating piston 28, slidably movable within the cylinder 26.

The combustion chamber 30 is configured for combusting an air/fuel mixture to provide energy to the propulsion system 10. Air may enter the combustion chamber 30 of the engine 13 by passing through the intake assembly 36, where airflow from the intake manifold into the combustion chamber 30 is controlled by at least one intake valve 32. Fuel is injected into the combustion chamber 30 to mix with the air, or is inducted through the intake valve(s) 32, which provides an air/fuel mixture. The air/fuel mixture is ignited within the combustion chamber 30. Combustion of the air/fuel mixture creates exhaust gas, which exits the combustion chamber 30 and is drawn into the exhaust manifold 38. More specifically, airflow (exhaust flow) out of the combustion chamber 30 is controlled by at least one exhaust valve 34.

Figure 2:
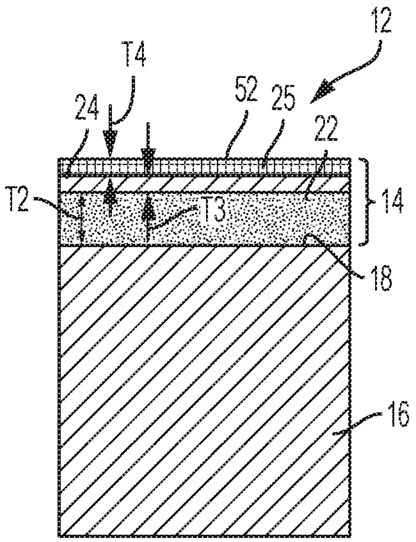
FIG. 2 is a schematic cross-sectional side view of one example of the thermal barrier coating disposed on the components of FIG. 1, according to the principles of the present disclosure.

With reference to FIGS. 1 and 2, the thermal barrier coating 14 may be disposed on a face or surface of one or more of the components 12 of the engine 13, e.g., the piston 28, the intake valve 32, exhaust valve 34, interior walls of the exhaust manifold 38 and/or the combustion dome 39, and the like. The thermal barrier coating 14 is bonded to the component 12 to form an insulator configured to reduce heat transfer losses, increase efficiency, and increase exhaust gas temperature during operation of the engine 13. The thermal barrier coating 14 is configured to provide low thermal conductivity and low heat capacity. The low thermal conductivity reduces heat transfer losses, and the low heat capacity results in the surface of the thermal barrier coating 14 tracking with the temperature of the gas during temperature swings, and heating of cool air entering the cylinder is minimized.

Referring to FIG. 2, each component 12 includes a substrate 16 presenting a surface 18, and the thermal barrier coating 14 is bonded to the surface 18 of the substrate 16. The thermal barrier coating 14 may include one, two, three, four, or more layers, by way of example. In FIG. 2, the thermal barrier coating 14 includes three layers, e.g., a first (insulating) layer 22, a second (sealing) layer 24, and a third (temperature-following) layer 25.

The insulating layer 22 may comprise a ceramic material, such as zirconia, stabilized zirconia, alumina, silica, rare earth aluminates, oxide perovskites, oxide spinels, and titanates. In other variations, the insulating layer 22 may be formed of porous aluminum oxide. In still other variations, the insulating may comprise a plurality of hollow microstructures bonded together, which is shown and described with greater detail with reference to FIG. 4. In some forms, the insulating layer 22 has a porosity in the range of 10% to 90%, and in other cases, the porosity of the insulating layer exceeds 90%, or even 95%. Preferably, the porosity of the insulating layer 22 is at least 80%, and in some cases it is preferable that the porosity of the insulating layer 22 is at least 95%. The high porosity provides for a corresponding volume of air and/or gasses to be contained therein, thus providing the desired insulating properties of low effective thermal conductivity and low effective heat capacity. The insulating layer 22 is preferably formed of a material having a low effective thermal conductivity, such as in the range of 0.1 to 5 W/mK, and from a material having a coefficient of thermal expansion similar to that of the substrate 16.

The insulating layer 22 could be applied by thermal spray techniques, such as air plasma spray or high velocity oxy-fuel plasma spray. In the case of a porous aluminum oxide insulating layer 22, the insulting layer 22 may be formed by anodizing.

To achieve the desired thermal barrier performance, the thickness of the insulating layer 22 may be tailored for specific applications. For example, a greater thickness T2 could be used if the insulating layer 22 is comprised of a material having a higher thermal conductivity, and a lesser thickness T2 could be used if the insulating layer 22 is comprised of a material having a lower thermal conductivity. In some examples, the insulating layer 22 has a thickness T2 in the range of 50 to 500 micron, or in the range of 50 to 1000 microns. In some variations, the insulating layer 22 is preferably not greater than 250 microns.

The insulating layer 22 is configured to withstand pressures of at least 80 bar, and in some cases at least 100 bar or at least 150 bar. Additionally, with respect to temperature, the insulating layer 22 is configured to withstand surface temperatures of at least 500 degrees Celsius (° C.), or at least 800° C., or even at least 1,100° C. The heat capacity of the thermal barrier coating 14 may be configured to ensure that the surface 18 of the substrate 16 does not get above 300° C.

The sealing layer 24 is disposed over the insulating layer 22, such that the insulating layer 22 is disposed between the sealing layer 24 and the surface 18 of the substrate 16 (in the example of FIG. 2). The sealing layer 24 is a high temperature, thin film. More specifically, the sealing layer 24 comprises material that is configured to withstand temperatures of at least 1,100° C. In some forms, the sealing layer 24 may be formed of a metallic material, such as stainless steel, nickel, iron, nickel alloy, cobalt alloy, refractory alloy, or any other desired metal. In other variations, the sealing layer 24 may comprise a ceramic material, and/or the sealing layer 24 may be substantially comprised of a ceramic material or comprised solely of a ceramic material, or of a dense glass. When the sealing layer 24 contains a ceramic material, the ceramic material may include zirconia, partially stabilized zirconia, silicon nitride, fused silica, barium-neodymium-titanate (BNT), any other desired ceramic, or combinations of these or other ceramics.

The sealing layer 24 is substantially non-permeable (or has very low permeability) to combustion gasses, such that a seal is provided between the sealing layer 24 and the insulating layer 22. For example, the sealing layer 24 may be no more than 10% porous. Such a seal prevents debris from combustion gasses, such as unburned hydrocarbons, soot, partially reacted fuel, liquid fuel, and the like, from entering the porous structure of the insulating layer 22. If such debris were allowed to enter the porous structure, air disposed in the porous structure would end up being displaced by the debris, and the insulating properties of the insulating layer 22 would be reduced or eliminated.

In one non-limiting example, the sealing layer 24 may be applied to the insulating layer 22 via electroplating or vapor deposition. In another non-limiting example, the sealing layer 24 may be applied to the insulating layer 22 simultaneously with sintering the insulating layer 22.

The sealing layer 24 is configured to be sufficiently resilient so as to resist fracturing or cracking during exposure to combustion gasses, thermal fatigue, or debris. Further, the sealing layer 24 is configured to be sufficiently resilient so as to withstand expansion and/or contraction of the underlying insulating layer 22.

In some forms, the sealing layer 24 is thin, with a thickness T3 not greater than 20 microns (μm) and in some cases not greater than 5 μm. However, the thickness T3 of the sealing layer 24 may be as great as 50 μm because the sealing layer 24 does not need to follow the temperature of the gas, given that the temperature-following layer 25 is disposed outward of the sealing layer 24 and is configured to follow the temperature of the gas. Thus, T3 may be in the range of 3 to 50 μm, by way of example. A thicker sealing layer 24, such as close to 50 microns, increases its structural integrity and robustness and decreases its permeability. In addition, a thicker sealing layer 24 decreases cost and manufacturing complexity.

The temperature-following layer 25 is disposed on and bonded to the sealing layer 24. The temperature-following layer 25 is porous and is configured to follow a temperature, or temperature swing, of an adjacent gas, such as gasses within the combustion chamber 30. Thus, the temperature-following layer 25 has an exposed edge 52 not covered by another layer so that the temperature-following layer 25 is exposed to adjacent gasses. The temperature-following layer 25 preferably has a very low heat capacity, allowing it to follow the temperature swing of the adjacent gasses. The temperature swing behavior of the temperature-following layer 25 enables increased thermal efficiency while mitigating the propensity for engine knock and reduced volumetric efficiency losses.

Extremely low heat capacity may be achieved by providing the temperature-following layer 25 with a high porosity. For example, the temperature-following layer 25 is preferably at least 90% porous. In some forms, the temperature-following layer 25 may be at least 93% porous, or even at least 98% porous. In some cases, the temperature-following layer 25 can even be 99% porous, or at least 99% porous.

The temperature-following layer 25 may have a variety of different forms, some examples of which will be described in greater detail below with reference to FIGS. 5-16B. Various different materials could be used for the temperature-following layer 25, depending in part on its configuration. For example, the temperature-following layer 25 may be formed of a metal that can withstand temperatures in excess of 1000° C. and is resistant to oxidation, such as nickel, cobalt, or iron, or their alloys. Preferably, the temperature-following layer 25 is formed of oxidation-resistant nickel-chromium, cobalt-chromium, iron chromium, nickel-chromium-aluminum, cobalt-chromium-aluminum, or iron-chromium-aluminum alloys. Refractory alloys based on zirconium, niobium, molybdenum, tantalum, and/or tungsten could also be chosen, but are less desired because of their high cost. The temperature-following layer 25 may also be formed from a ceramic, such as zirconia, stabilized zirconia, alumina, rare-earth aluminate, silicon carbide, silicon nitride, alumino-silicate, and/or mullite. The temperature-following layer 25 may be catalytic and configured to burn off combustion product material, in some examples.

The temperature-following layer 25 preferably has a height T4 not greater than 50 microns, in one example. In other examples, the temperature-following layer may have a height T4 in the range of 10 to 300 microns.

Figure 3:
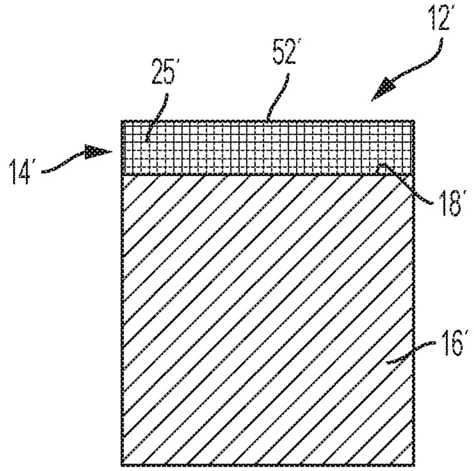
FIG. 3 is a schematic cross-sectional side view of another example of the thermal barrier coating disposed on the components of FIG. 1, according to the principles of the present disclosure.

Referring now to FIG. 3, the component of FIG. 1 (labeled as 12' here) is illustrated again with another variation of the thermal barrier coating 14' disposed thereon. Again, the component 12' includes a substrate 16' presenting a surface 18', and the thermal barrier coating 14' is bonded to the surface 18' of the substrate 16'. In this example, the thermal barrier coating 14' includes only one layer: the temperature-following layer 25'. The temperature-following layer 25' is bonded onto the surface 18' of the substrate 16'. The temperature-following layer 25' may have any configurations or characteristics described above with respect to the temperature-following layer 25 or below in FIGS. 5-16B. For example, the temperature-following layer 25' has an exposed edge 52' not covered by another layer so that the temperature-following layer 25' is exposed to adjacent gasses.

Figure 4:
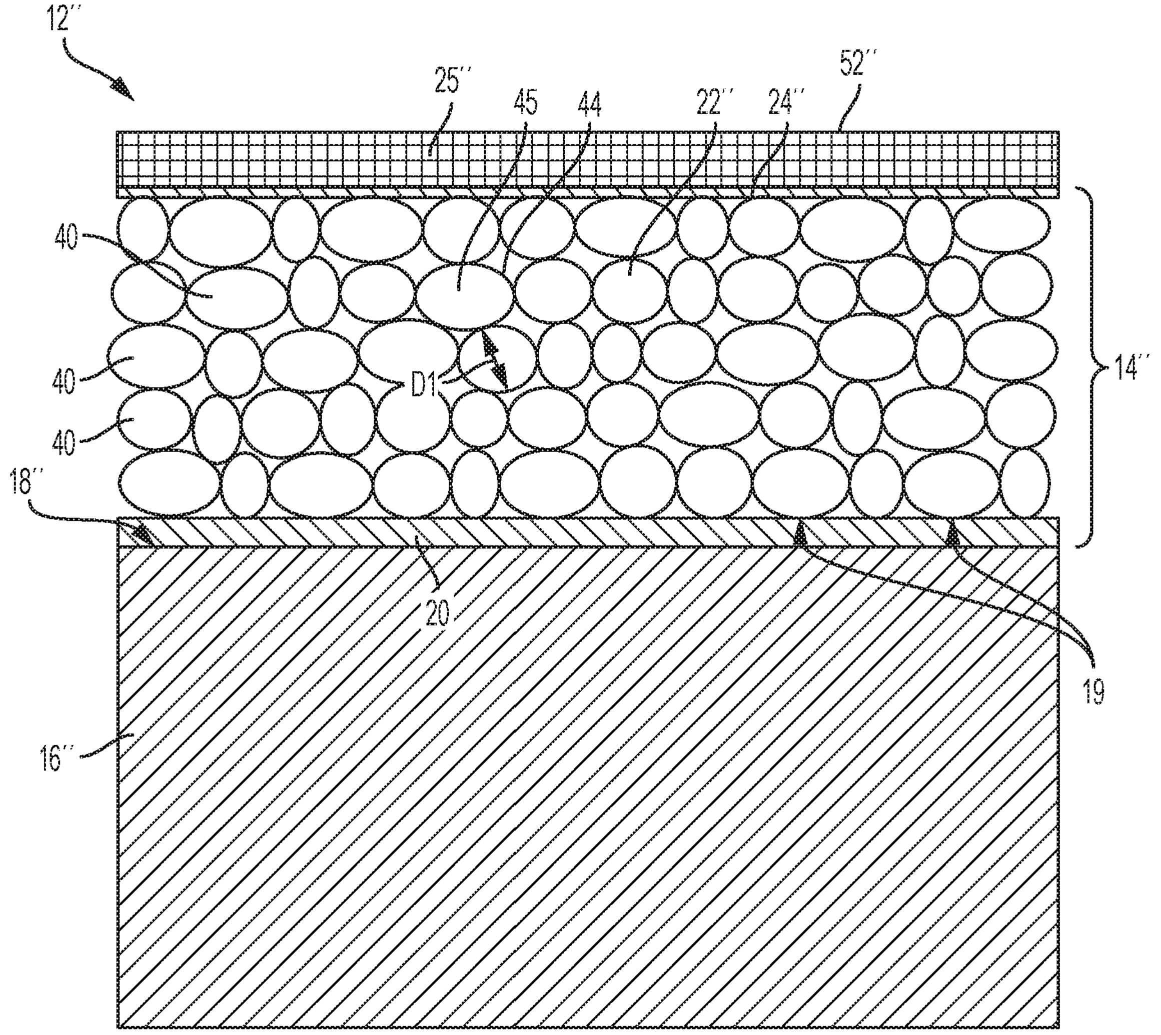
FIG. 4 is a schematic cross-sectional side view of yet another example of the thermal barrier coating disposed on the components of FIG. 1, in accordance with the principles of the present disclosure.

Referring now to FIG. 4, the component of FIG. 1 (labeled as 12" here) is illustrated again with another variation of the thermal barrier coating 14" disposed thereon. Again, the component 12" includes a substrate 16" presenting a surface 18", and the thermal barrier coating 14" is bonded to the surface 18" of the substrate 16". In this example, the thermal barrier coating 14" includes four layers: a base bonding layer 20, an insulating layer 22", a sealing layer 24", and a temperature-following layer 25".

The temperature-following layer 25" may have any configurations or characteristics described above with respect to the temperature-following layer 25 shown and described with respect to FIG. 2 or below in FIGS. 5-16B. For example, the temperature-following layer 25" has an exposed edge 52" not covered by another layer so that the temperature-following layer 25" is exposed to adjacent gasses. Likewise, the sealing layer 24" may have any of the configurations described above with respect to the sealing layer 24 shown and described with respect to FIG. 2.

In the variation of FIG. 4, the insulating layer 22" includes a plurality of hollow microstructures 40, bonded or sintered together to create a layer having an extremely high porosity. Preferably, the porosity of the insulating layer 22" is at least 80%. More preferably, the porosity of the insulating layer 22" is at least 90%, or even 95%. The high porosity provides for a corresponding volume of air and/or gases to be contained therein, thus providing the desired insulating properties of low effective thermal conductivity and low effective heat capacity.

In one example, the hollow microstructures 40 may be comprised of hollow polymer, metal, glass, and/or ceramic centers 45, which may be, or may start off as being, spherical, elliptical, or oval in shape. Thus, in some examples, the microstructures 40 are round. At least one metallic coating layer 44 may be disposed on an exterior surface of each hollow center 45; in some cases, a first metal coating may be overcoated with a second metal coating. The metallic coating layer 44 may include nickel (Ni), iron, or the like, alone or in combination. The metallic coating layer 44 may be disposed on the exterior surface of the microstructures 40 via electroplating, flame spraying, painting, electroless plating, vapor deposition, or the like.

It should be appreciated that during the bonding or sintering of the metallic coated microstructures 40, the hollow centers 45 that are comprised of polymer, metal, and glass having a melting temperature that is less than that of the metallic coating layer 44, and therefore, the hollow centers 45 may melt or otherwise disintegrate to become part of the metallic coating layer 44 itself, or melt and turn into a lump of material within the hollow microstructure 40. However, when the melting temperature of the hollow center 45 is higher than the melting temperature of the material of the metallic coating layer 44, such as when the hollow center 45 is formed from a ceramic material, the hollow center 45 remains intact and does not disintegrate or become absorbed.

In instances where the hollow centers 45 are formed from polymer, metal, and glass, the hollow center 45 may melt as a function of a material properties of the hollow center 45 and a sintering temperature applied to the microstructures 40. Therefore, when melting of the hollow centers 45 occurs, the metallic coating layer 44 is no longer a "coating", but rather becomes an inner wall of the microstructure 40.

In examples where the microstructures 40 are round or elliptical, such as shown in FIG. 4, the hollow microstructures 40 may have a diameter D1 of between 5 and 100 μm, between 20 and 100 μm, or between 20-40 μm, by way of example. It should be appreciated that the microstructures 40 do not necessarily have the same diameter, as a mixture of diameters may be configured to provide a desired open porosity, e.g., packing density, to provide a desired amount of strength to the insulating layer 22".

A plurality of the hollow microstructures 40 may be molded or sintered at a sintering temperature, under pressure, for a molding time, until bonds are formed between the coating layers 44 of adjacent hollow microstructures 40 forming the insulating layer 22". The sintering temperature may approach the melting temperature of the metallic coating layer 44. However, in the case where the hollow centers 45 are comprised of ceramic material, the sintering temperature will not be below the melting temperature of the metal coated centers 45.

The bonding layer 20 is configured to bond to the surface 18" of the substrate 16" and to the insulating layer 22", such that the insulating layer 22" is attached to the substrate 16". In one non-limiting example, the bonding layer 20 is configured to diffuse into the surface 18" of the substrate 16" and into the insulating layer 22" to form bonds therebetween.

In one non-limiting example, the substrate 16" comprises aluminum, the insulating layer 22" comprises nickel-coated microstructures 40, and the bonding layer 20 comprises copper and/or brass (a copper-zinc (Cu—Zn) alloy material). Copper and/or brass create optimum bonding strength, optimum thermal expansion characteristics, heat treatment processes, fatigue resistance, and the like. In addition, copper and/or brass have good solid solubility in aluminum, nickel, and iron, while iron and nickel have very low solid solubility in aluminum. Thus, a bonding layer 20 having copper and/or brass combinations provides an intermediate structural layer that promotes diffusion bonding between the adjacent aluminum substrate 16" and the adjacent nickel or iron insulating layer 22". It should be appreciated, however, that the substrate 16", insulating layer 22", and bonding layer 20 are not limited to aluminum, nickel, and brass, but may comprise other materials. For example, in another variation, the insulating layer 22" is substantially comprised of nickel and the substrate 16" includes or is substantially comprised of iron.

One side of the bonding layer 20 may be disposed across the surface 18" of the substrate 16", such that the bonding layer 20 is disposed between the substrate 16" and the insulating layer 22". A compressive force may be applied to the insulating layer 22" and the substrate 16", at a bonding temperature, for at least a minimum apply time. The melting temperature of the material of the bonding layer 20 is less than the melting temperature of each of the substrate 16" and the material of the insulating layer 22". In another example, the melting temperature of the material of the bonding layer 20 is between the melting temperature of each of the substrate 16" and the material of the insulating layer 22". Further, the required bonding temperature may be less than the melting temperature of the material of the substrate 16" and the material of the insulating layer 22", but sufficiently high enough to encourage diffusion bonding to occur between the metallic material of the substrate 16" and the metallic material of the bonding layer 20 and between the metallic material of the bonding layer 20 and the metallic material of the insulating layer 22".

It should be appreciated that the bonding layer 20 may be bonded to an inner surface of the insulating layer 22" prior to bonding the bonding layer 20 to the surface 18" of the substrate 16". Additionally, the bonding layer 20 is not limited to being bonded to the surface 18" of the substrate 16" and/or the insulating layer 22" with solid-state diffusion, as other methods of adhesion may also be used, such as by wetting, brazing, and combinations thereof. It should be appreciated that any desired number of bonding layers 20 may be applied, providing the desired characteristics, so long as the bonding layer 20 as a whole bonds to the insulating layer 22" and to the substrate 16".

The insulating layer 22" may also include more than one layer. For example, the insulating layer 22" may include the microstructures 40, as shown, and a transition layer (not shown) disposed between the microstructures 40 and the bonding layer 20. The transition layer could comprise nickel or iron, by way of example, and be configured as a thin metallic layer similar to the bonding layer 20. In some examples, the metallic material of the transition layer and the coating for the microstructures 40 may be identical to promote bonding between the transition layer and the microstructures 40. As such, the microstructures 40 adjacent to the inner edge 19 are bonded to the transition layer when the microstructures 40 and the transition layer are heated to a temperature sufficient to sinter the microstructures 40 to the transition layer. If included, the transition layer provides a supporting structure or backbone for the microstructures 40, thus giving the insulating layer 22" strength and rigidity. Upon the application of heat to the transition layer and the bonding layer 20, for a sufficient amount of time, metal diffusion occurs between the bonding layer 20 and the substrate 16" and between the bonding layer 20 and the transition layer of the insulating layer 22". A transition layer provides greater surface area contact to the bonding layer 20 for promoting a large area of diffusion bonding.

Furthermore, the sealing layer 24" may also include more than one layer to provide desired properties, e.g., super-high temperature resistance and corrosion resistance.

Figure 5:
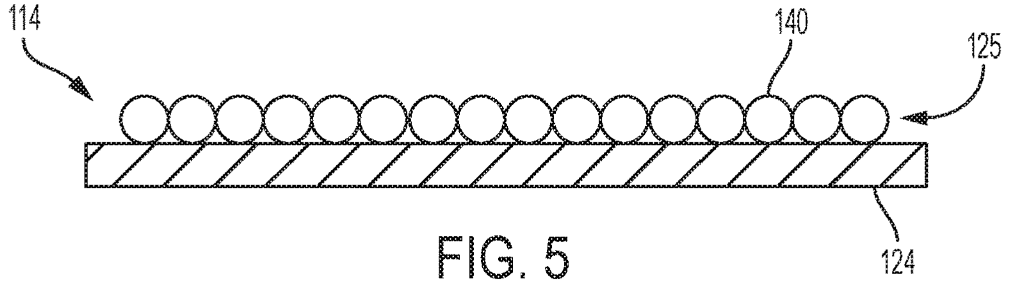
FIG. 5 is a schematic cross-sectional side view of still another example of the thermal barrier coating disposed on the components of FIG. 1, in accordance with the principles of the present disclosure.

Referring now to FIG. 5, one variation of a thermal barrier coating 114 is illustrated having a temperature-following layer 125 disposed on a sealing layer 124. The thermal barrier coating 114 may be used in place of one of the thermal barrier coatings 14, 14', 14" described above, and it should be understood that the sealing layer 124 may be configured as described above with respect to FIG. 2 or 4. Similarly, the temperature-following layer 125 may incorporate any of the features described above with respect to the temperature-following layers 25, 25', 25" shown and described above with respect to FIGS. 2-4. Thus, even though the temperature-following layer 125 is disposed on a sealing layer 124 in FIG. 5, it should be understood that the temperature-following layer 125 could alternatively be disposed directly on the surface 18' or a substrate 16', as shown in FIG. 3. An insulating layer 22, 22" and a bonding layer 20 are not illustrated in FIG. 5, but it should be understood that the insulating layer 22, 22" and bonding layer 20, having any of the variations described above, could also be included with the thermal barrier coating 114 of FIG. 5.

The temperature-following layer 125 comprises a single layer of round microstructures 140 bonded or sintered together; however, more than one layer of microstructures 140 could alternatively be included. The microstructures 140 are hollow micro-shells and may be the same or similar to the microstructures 40 described above with respect to the insulating layer 22" of FIG. 4, including being constructed as described above. For example, the hollow microstructures 140 may be formed of ceramic and/or metal, and each hollow microstructure 140 may have an outer diameter in the range of 10 to 100 microns. The description of the microstructures 40 described above is incorporated herein and applied to the microstructures 140.

Figure 6:
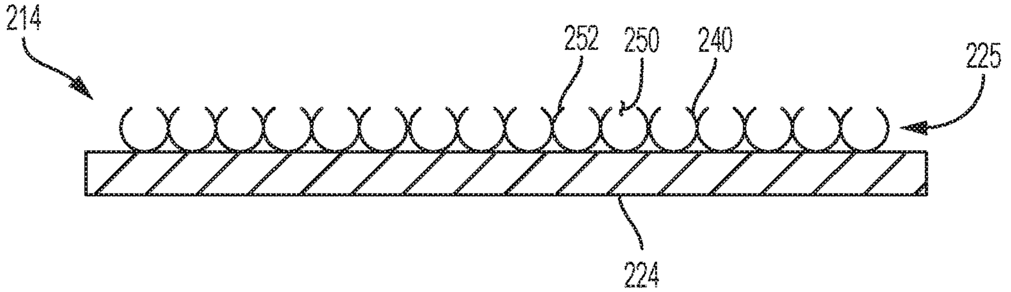
FIG. 6 is a schematic cross-sectional side view of still another example of the thermal barrier coating disposed on the components of FIG. 1, in accordance with the principles of the present disclosure.

Referring now to FIG. 6, another variation of a thermal barrier coating 214 is illustrated having a temperature-following layer 225 disposed on a sealing layer 224. The thermal barrier coating 214 may be used in place of one of the thermal barrier coatings 14, 14', 14" described above, and the sealing layer 224 may be configured as described above with respect to FIG. 2 or 4. Similarly, the temperature-following layer 225 may incorporate any of the features described above with respect to the temperature-following layers 25, 25', 25" shown and described above with respect to FIGS. 2-4. Thus, even though the temperature-following layer 225 is disposed on a sealing layer 224 in FIG. 6, it should be understood that the temperature-following layer 225 could alternatively be disposed directly on the surface 18' or a substrate 16', as shown in FIG. 3. An insulating layer 22, 22" and a bonding layer 20 are not illustrated in FIG. 6, but it should be understood that the insulating layer 22, 22" and bonding layer 20, having any of the variations described above, could also be included with the thermal barrier coating 214 of FIG. 6.

The temperature-following layer 225 comprises a single layer of round microstructures 240 bonded or sintered together; however, more than one layer could be included if desired. The microstructures 240 may be similar to the microstructures 40 or microstructures 140 described above with respect to the insulating layer 22" of FIG. 4 or the temperature-following layer 125 in FIG. 5. Thus, the description, examples, and features of microstructures 40 and microstructures 140 described above are incorporated herein and applied to the microstructures 240.

In FIG. 6, the microstructures 240 each have an opening 250 along an outer edge 252 of the temperature-following layer 225. In one example, the openings 250 may be formed by sanding or polishing along the outer edge 252 to open each microstructure 240 along the outer edge 252.

Figure 7:
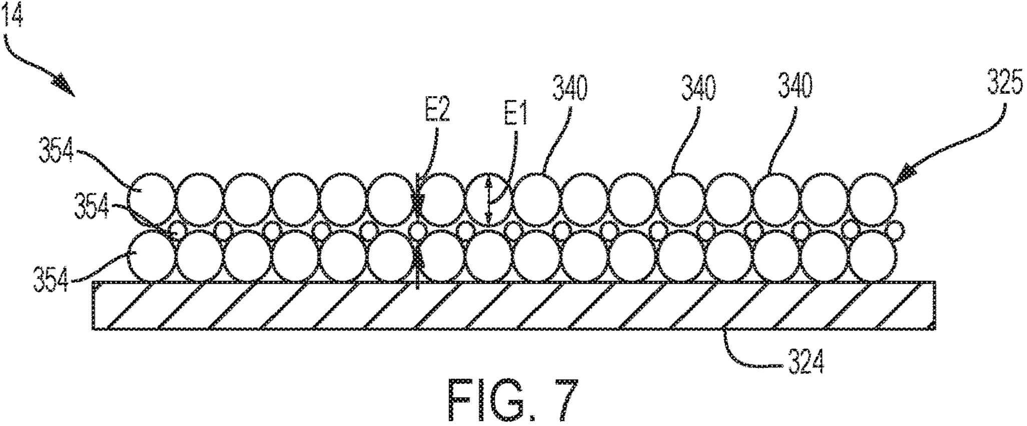
FIG. 7 is a schematic cross-sectional side view of still another example of the thermal barrier coating disposed on the components of FIG. 1, in accordance with the principles of the present disclosure.

Referring now to FIG. 7, yet another variation of a thermal barrier coating 314 is illustrated having a temperature-following layer 325 disposed on a sealing layer 324. The thermal barrier coating 314 may be used in place of one of the thermal barrier coatings 14, 14', 14" described above, and the sealing layer 324 may be configured as described above with respect to FIG. 2 or 4. Similarly, the temperature-following layer 325 may incorporate any of the features described above with respect to the temperature-following layers 25, 25', 25" shown and described above with respect to FIGS. 2-4. Thus, even though the temperature-following layer 325 is disposed on a sealing layer 324 in FIG. 7, it should be understood that the temperature-following layer 325 could alternatively be disposed directly on the surface 18' or a substrate 16', as shown in FIG. 3. An insulating layer 22, 22" and a bonding layer 20 are not illustrated in FIG. 7, but it should be understood that the insulating layer 22, 22" and bonding layer 20, having any of the variations described above, could also be included with the thermal barrier coating 314 of FIG. 7.

The temperature-following layer 325 comprises multiple layers 354 of hollow round microstructures 340 bonded or sintered together and having various sizes or diameters E1, E2, as a mixture of diameters E1, E2 may be configured to provide a desired open porosity, e.g., packing density, to provide a desired amount of strength to the temperature-following layer 325. The microstructures 340 may be similar to the microstructures 40 or microstructures 140, 240 described above with respect to the insulating layer 22" of FIG. 4 or the temperature-following layers 125, 225 in FIGS. 5-6. Thus, the description, examples, and features of the microstructures 40 and microstructures 140, 240 described above are incorporated herein and applied to the microstructures 340.

Figure 8:
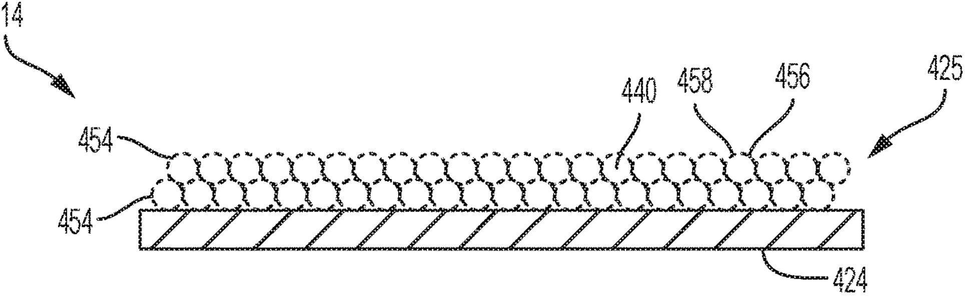
FIG. 8 is a schematic cross-sectional side view of still another example of the thermal barrier coating disposed on the components of FIG. 1, in accordance with the principles of the present disclosure.

Referring now to FIG. 8, still another variation of a thermal barrier coating 414 is illustrated having a temperature-following layer 425 disposed on a sealing layer 424. The thermal barrier coating 414 may be used in place of one of the thermal barrier coatings 14, 14', 14" described above, and the sealing layer 424 may be configured as described above with respect to FIG. 2 or 4. Similarly, the temperature-following layer 425 may incorporate any of the features described above with respect to the temperature-following layers 25, 25', 25" shown and described above with respect to FIGS. 2-4. Thus, even though the temperature-following layer 425 is disposed on a sealing layer 424 in FIG. 8, it should be understood that the temperature-following layer 425 could alternatively be disposed directly on the surface 18' or a substrate 16', as shown in FIG. 3. An insulating layer 22, 22" and a bonding layer 20 are not illustrated in FIG. 8, but it should be understood that the insulating layer 22, 22" and bonding layer 20, having any of the variations described above, could also be included with the thermal barrier coating 414 of FIG. 8.

The temperature-following layer 425 comprises multiple layers 454 (in this case, two layers 454) of hollow round microstructures 440 bonded or sintered together. The microstructures 440 may be similar to the microstructures 40 or microstructures 140, 240, 340 described above with respect to the insulating layer 22" of FIG. 4 or the temperature-following layers 125, 225, 325 in FIGS. 5-7. Thus, the description, examples, and features of the microstructures 40 and microstructures 140, 240, 340 described above are incorporated herein and applied to the microstructures 440. The microstructures 440 of FIG. 8 are porous, as represented by small openings 456 along the periphery 458 of each microstructure 440. A porous microstructure 440 may trap more gasses within the microstructures 440 than a solid microstructure would, allowing the microstructures 440 of the temperature-following layer 425 to take on the temperature of the gasses.

Figure 9A:
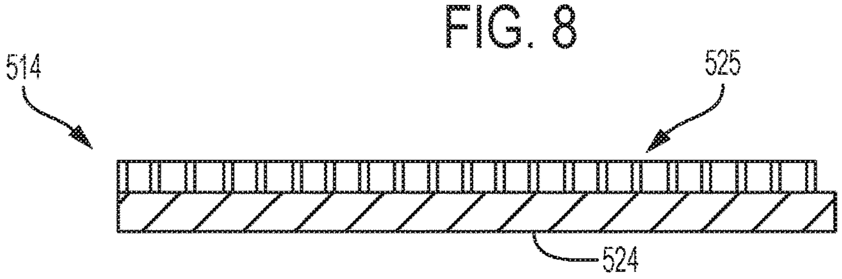
FIG. 9A is a schematic cross-sectional side view of still another example of the thermal barrier coating disposed on the components of FIG. 1, in accordance with the principles of the present disclosure.
Figure 9B:
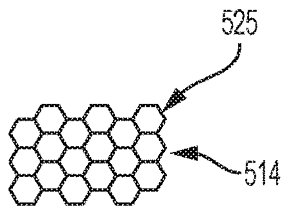
FIG. 9B is a schematic plan view of an outermost layer of the thermal barrier coating shown in FIG. 9A, according to the principles of the present disclosure.

Referring now to FIGS. 9A-9B, still another variation of a thermal barrier coating 514 is illustrated having a temperature-following layer 525 disposed on a sealing layer 524. The thermal barrier coating 514 may be used in place of one of the thermal barrier coatings 14, 14', 14" described above, and the sealing layer 524 may be configured as described above with respect to FIG. 2 or 4. Similarly, the temperature-following layer 525 may incorporate any of the features described above with respect to the temperature-following layers 25, 25', 25" shown and described above with respect to FIGS. 2-4. Thus, even though the temperature-following layer 525 is disposed on a sealing layer 524 in FIG. 9A, it should be understood that the temperature-following layer 525 could alternatively be disposed directly on the surface 18' or a substrate 16', as shown in FIG. 3. An insulating layer 22, 22" and a bonding layer 20 are not illustrated in FIGS. 9A-9B, but it should be understood that the insulating layer 22, 22" and bonding layer 20, having any of the variations described above, could also be included with the thermal barrier coating 514 of FIGS. 9A-9B.

The temperature-following layer 525 comprises an open cell honeycomb structure. In this case, the honeycomb structure forms a plurality of attached together hollow hexagons.

Figure 10:
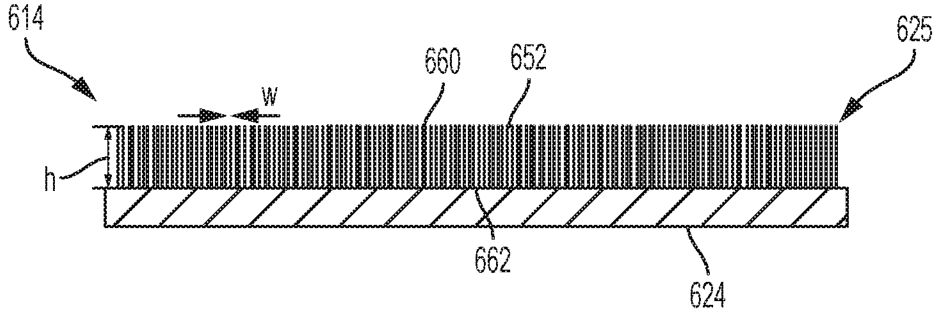
FIG. 10 is a schematic cross-sectional side view of still another example of the thermal barrier coating disposed on the components of FIG. 1, in accordance with the principles of the present disclosure.

Referring now to FIG. 10, still another variation of a thermal barrier coating 614 is illustrated having a temperature-following layer 625 disposed on a sealing layer 624. The thermal barrier coating 614 may be used in place of one of the thermal barrier coatings 14, 14', 14" described above, and the sealing layer 624 may be configured as described above with respect to FIG. 2 or 4. Similarly, the temperature-following layer 625 may incorporate any of the features described above with respect to the temperature-following layers 25, 25', 25" shown and described above with respect to FIGS. 2-4. Thus, even though the temperature-following layer 625 is disposed on a sealing layer 624 in FIG. 10, it should be understood that the temperature-following layer 325 could alternatively be disposed directly on the surface 18' or a substrate 16', as shown in FIG. 3. An insulating layer 22, 22" and a bonding layer 20 are not illustrated in FIG. 10, but it should be understood that the insulating layer 22, 22" and bonding layer 20, having any of the variations described above, could also be included with the thermal barrier coating 614 of FIG. 10.

The temperature-following layer 625 comprises a plurality of whiskers or pillars 660 extending from an inner side 662 of the temperature-following layer 625 to an outer side 652 of the temperature-following layer 625. Each pillar 660 may be called a micro-pillar or a nano-pillar, as the pillars 660 may have widths that are less than 1 micron. For example, each of the pillars 660 may have a height h in the range of 10 to 100 microns, and a width w in the range of $1/1000$ to $1/20$ of the height h (such as 10 nm to 5 μm). In the example of FIG. 10, each pillar 660 is substantially straight along its height h, but in the alternative, the pillars 660 could have a configuration that is not straight, such as a wavy or interwoven configuration. The pillars 660 may be formed of zinc oxide or iron oxide, by way of example.

Figure 11:
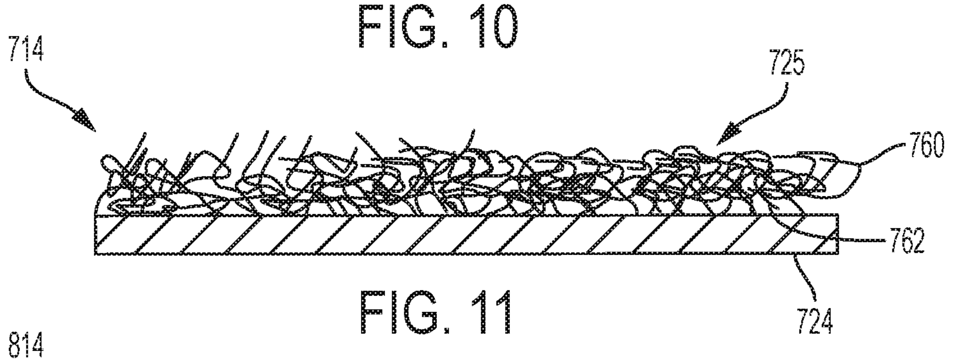
FIG. 11 is a schematic cross-sectional side view of still another example of the thermal barrier coating disposed on the components of FIG. 1, in accordance with the principles of the present disclosure.

Referring now to FIG. 11, still another variation of a thermal barrier coating 714 is illustrated having a temperature-following layer 725 disposed on a sealing layer 724. The thermal barrier coating 714 may be used in place of one of the thermal barrier coatings 14, 14', 14" described above, and the sealing layer 724 may be configured as described above with respect to FIG. 2 or 4. Similarly, the temperature-following layer 725 may incorporate any of the features described above with respect to the temperature-following layers 25, 25', 25" shown and described above with respect to FIGS. 2-4. Thus, even though the temperature-following layer 725 is disposed on a sealing layer 724 in FIG. 11, it should be understood that the temperature-following layer 725 could alternatively be disposed directly on the surface 18' or a substrate 16', as shown in FIG. 3. An insulating layer 22, 22" and a bonding layer 20 are not illustrated in FIG. 11, but it should be understood that the insulating layer 22, 22" and bonding layer 20, having any of the variations described above, could also be included with the thermal barrier coating 714 of FIG. 11.

The temperature-following layer 725 has a fibrous structure. In the particular illustrated example, the fibrous structure comprises a plurality of pillars 760 extending from an inner side 762 of the temperature-following layer 725 and interwoven into a fibrous structure. Like the pillars 660 described above with respect to FIG. 10, each pillar 760 may be called a micro-pillar or a nano-pillar, as the pillars 760 may have widths that are less than 1 micron. For example, each of the pillars 760 may have a height h in the range of 10 to 100 microns and a width w in the range of $1/1000$ to $1/20$ of the height h (such as 10 nm to 5 μm). The pillars 760 may be formed of zinc oxide or iron oxide, by way of example.

Figure 12A:
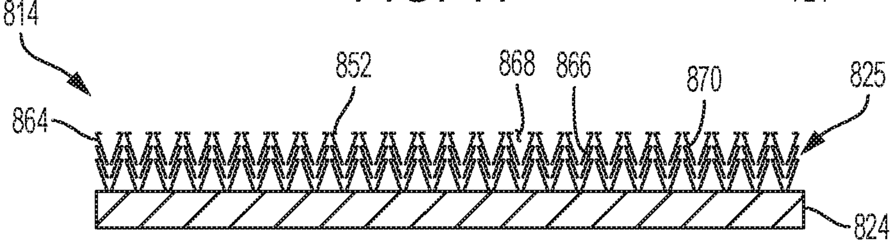
FIG. 12A is a schematic cross-sectional side view of still another example of the thermal barrier coating disposed on the components of FIG. 1, in accordance with the principles of the present disclosure.
Figure 12B:
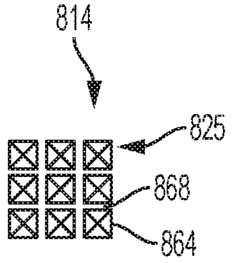
FIG. 12B is a schematic plan view of an outermost layer of the thermal barrier coating shown in FIG. 12A, according to the principles of the present disclosure.

Referring now to FIGS. 12A-12B, still another variation of a thermal barrier coating 814 is illustrated having a temperature-following layer 825 disposed on a sealing layer 824. The thermal barrier coating 814 may be used in place of one of the thermal barrier coatings 14, 14', 14" described above, and the sealing layer 824 may be configured as described above with respect to FIG. 2 or 4. Similarly, the temperature-following layer 825 may incorporate any of the features described above with respect to the temperature-following layers 25, 25', 25" shown and described above with respect to FIGS. 2-4. Thus, even though the temperature-following layer 825 is disposed on a sealing layer 824 in FIG. 12A, it should be understood that the temperature-following layer 825 could alternatively be disposed directly on the surface 18' or a substrate 16', as shown in FIG. 3. An insulating layer 22, 22" and a bonding layer 20 are not illustrated in FIGS. 12A-12B, but it should be understood that the insulating layer 22, 22" and bonding layer 20, having any of the variations described above, could also be included with the thermal barrier coating 814 of FIGS. 12A-12B.

The temperature-following layer 825 includes structures 864 forming a plurality of pockets 866. In this case, the structures 864 define open ends 868 of the pockets 866 along an outer side 852 of the temperature-following layer 825. The pockets 866, in this example, are gas-trapping pockets 866. The structure 864 has portions forming outer walls 870 over the gas-trapping pockets 866. Thus, the structure 864 forms one-way flow gas trapping pockets 866, where the outer walls 870 trap gas that enters the pockets 866.

Figure 13A:
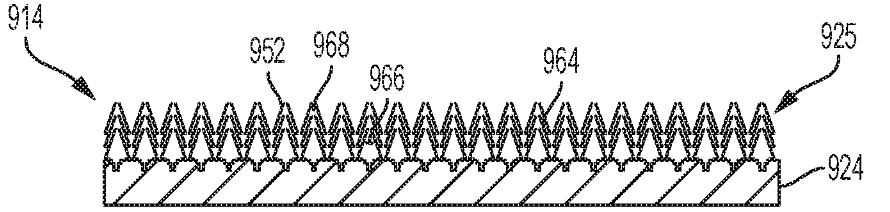
FIG. 13A is a schematic cross-sectional side view of still another example of the thermal barrier coating disposed on the components of FIG. 1, in accordance with the principles of the present disclosure.
Figure 13B:
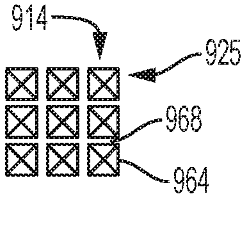
FIG. 13B is a schematic plan view of an outermost layer of the thermal barrier coating shown in FIG. 13A, according to the principles of the present disclosure.

Referring now to FIGS. 13A-13B, still another variation of a thermal barrier coating 914 is illustrated having a temperature-following layer 925 disposed on a sealing layer 924. The thermal barrier coating 914 may be used in place of one of the thermal barrier coatings 14, 14', 14" described above, and the sealing layer 924 may be configured as described above with respect to FIG. 2 or 4. Similarly, the temperature-following layer 925 may incorporate any of the features described above with respect to the temperature-following layers 25, 25', 25" shown and described above with respect to FIGS. 2-4. Thus, even though the temperature-following layer 925 is disposed on a sealing layer 924 in FIG. 13A, it should be understood that the temperature-following layer 925 could alternatively be disposed directly on the surface 18' or a substrate 16', as shown in FIG. 3. An insulating layer 22, 22" and a bonding layer 20 are not illustrated in FIGS. 13A-13B, but it should be understood that the insulating layer 22, 22" and bonding layer 20, having any of the variations described above, could also be included with the thermal barrier coating 914 of FIGS. 13A-13B.

The temperature-following layer 925 is another variation including structures 964 forming a plurality of pockets 966. In this case, the structures 964 define open ends 968 of the pockets 966 along an outer side 952 of the temperature-following layer 925. The pockets 966, in this example, are gas-trapping pockets 966, wherein the structure 964 helps to trap gas within the pockets 966.

Figure 14A:
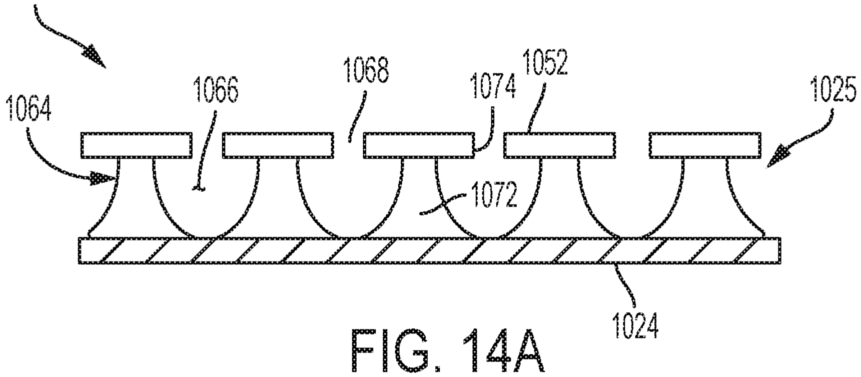
FIG. 14A is a schematic cross-sectional side view of still another example of the thermal barrier coating disposed on the components of FIG. 1, in accordance with the principles of the present disclosure.
Figure 14B:
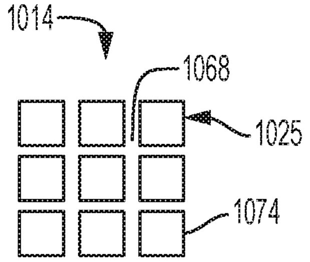
FIG. 14B is a schematic plan view of an outermost layer of the thermal barrier coating shown in FIG. 14A, according to the principles of the present disclosure.

Referring now to FIGS. 14A-14B, still another variation of a thermal barrier coating 1014 is illustrated having a temperature-following layer 1025 disposed on a sealing layer 1024. The thermal barrier coating 1014 may be used in place of one of the thermal barrier coatings 14, 14', 14" described above, and the sealing layer 1024 may be configured as described above with respect to FIG. 2 or 4. Similarly, the temperature-following layer 1025 may incorporate any of the features described above with respect to the temperature-following layers 25, 25', 25" shown and described above with respect to FIGS. 2-4. Thus, even though the temperature-following layer 1025 is disposed on a sealing layer 1024 in FIG. 14A, it should be understood that the temperature-following layer 1025 could alternatively be disposed directly on the surface 18' or a substrate 16', as shown in FIG. 3. An insulating layer 22, 22" and a bonding layer 20 are not illustrated in FIGS. 14A-14B, but it should be understood that the insulating layer 22, 22" and bonding layer 20, having any of the variations described above, could also be included with the thermal barrier coating 1014 of FIGS. 14A-14B.

The temperature-following layer 1025 includes structures 1064 forming a plurality of pockets 1066. In this case, the structures 1064 define open ends 1068 of the pockets 1066 along an outer side 1052 of the temperature-following layer 1025. The pockets 1066, in this example, are gas-trapping pockets 1066. The structures 1064 are configured with a table-top configuration having a curved base portion 1072 attached to the sealing layer 1024 (or substrate 16' in the example of FIG. 3) and to a table top 1074 disposed along the outer edge 1052.

Figure 15A:
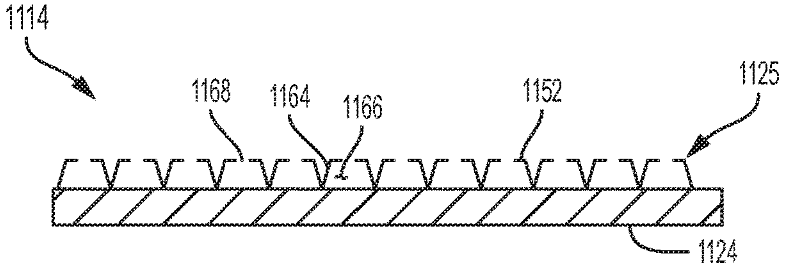
FIG. 15A is a schematic cross-sectional side view of still another example of the thermal barrier coating disposed on the components of FIG. 1, in accordance with the principles of the present disclosure.
Figure 15B:
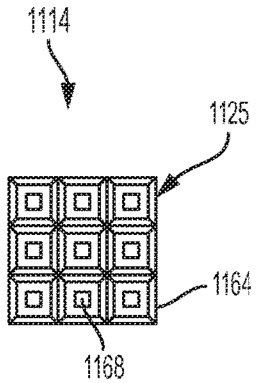
FIG. 15B is a schematic plan view of an outermost layer of the thermal barrier coating shown in FIG. 15A, according to the principles of the present disclosure.

Referring now to FIGS. 15A-15B, still another variation of a thermal barrier coating 1114 is illustrated having a temperature-following layer 1125 disposed on a sealing layer 1124. The thermal barrier coating 1114 may be used in place of one of the thermal barrier coatings 14, 14', 14" described above, and the sealing layer 1124 may be configured as described above with respect to FIG. 2 or 4. Similarly, the temperature-following layer 1125 may incorporate any of the features described above with respect to the temperature-following layers 25, 25', 25" shown and described above with respect to FIGS. 2-4. Thus, even though the temperature-following layer 1125 is disposed on a sealing layer 1124 in FIG. 15A, it should be understood that the temperature-following layer 1125 could alternatively be disposed directly on the surface 18' or a substrate 16', as shown in FIG. 3. An insulating layer 22, 22" and a bonding layer 20 are not illustrated in FIGS. 15A-15B, but it should be understood that the insulating layer 22, 22" and bonding layer 20, having any of the variations described above, could also be included with the thermal barrier coating 1114 of FIGS. 15A-15B.

The temperature-following layer 1125 includes structures 1164 forming a plurality of pockets 1166. In this case, the structures 1164 define open ends 1168 of the pockets 1166 along an outer side 1152 of the temperature-following layer 1125. The pockets 1166, in this example, are gas-trapping pockets 1166. The structures 1164 may be formed of thin nano-wires that are less than 1 micron thick, if desired.

Figure 16A:
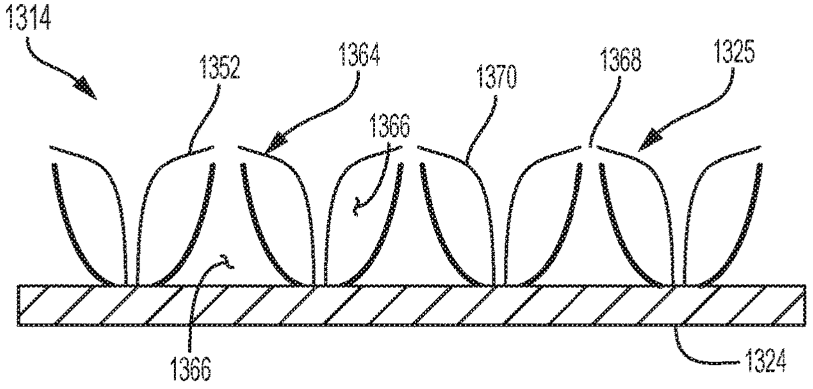
FIG. 16A is a schematic cross-sectional side view of still another example of the thermal barrier coating disposed on the components of FIG. 1, in accordance with the principles of the present disclosure.
Figure 16B:
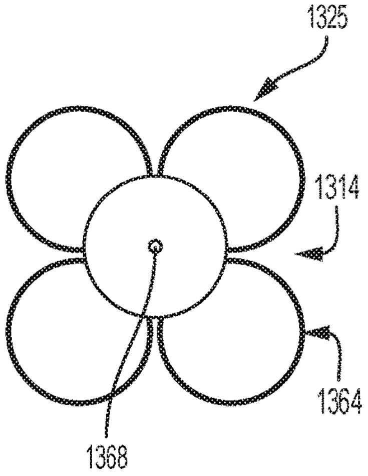
FIG. 16B is a schematic plan view of an outermost layer of the thermal barrier coating shown in FIG. 16A, according to the principles of the present disclosure.

Referring now to FIGS. 16A-16B, still another variation of a thermal barrier coating 1314 is illustrated having a temperature-following layer 1325 disposed on a sealing layer 1324. The thermal barrier coating 1314 may be used in place of one of the thermal barrier coatings 14, 14', 14" described above, and the sealing layer 1324 may be configured as described above with respect to FIG. 2 or 4. Similarly, the temperature-following layer 1325 may incorporate any of the features described above with respect to the temperature-following layers 25, 25', 25" shown and described above with respect to FIGS. 2-4. Thus, even though the temperature-following layer 1325 is disposed on a sealing layer 1324 in FIG. 16A, it should be understood that the temperature-following layer 1325 could alternatively be disposed directly on the surface 18' or a substrate 16', as shown in FIG. 3. An insulating layer 22, 22" and a bonding layer 20 are not illustrated in FIGS. 16A-16B, but it should be understood that the insulating layer 22, 22" and bonding layer 20, having any of the variations described above, could also be included with the thermal barrier coating 1314 of FIGS. 16A-16B.

The temperature-following layer 1325 includes structures 1364 forming a plurality of pockets 1366. In this case, the structures 1364 define open ends 1368 of the pockets 1366 along an outer side 1352 of the temperature-following layer 1325. The pockets 1366, in this example, are gas-trapping pockets 1366. The structure 1364 has portions forming curved outer walls 1370 over some of the gas-trapping pockets 1366.

There are a variety of different ways to form the temperature-following layer 25, 25', 25", 125, 225, 325, 425, 525, 625, 725, 825, 925, 1025, 1125, 1325 (collectively referred to in the duration of this Description as 25*), such as by micro-machining, electrical discharge machining, etching, expanded cell technology, and other various metal working techniques. If made of formed metal, the temperature-following layer 25* can then be bonded to the sealing layer 24, 24" via sintering, brazing, welding, or other bonding techniques. In some forms, the temperature-following layer 25* may even be formed of out of the top surface of the sealing layer 24, 24". Furthermore, complex cellular architectures can be achieved by lithography combined with electroforming. For example, a negative of a complex structure, such as that shown in FIGS. 15A-15B, could be applied to the sealing layer 24, 24" by photolithography and then the positive structure could be electroformed, e.g., out of nickel. In the alternative, three-dimensional nanolithography or projection micro-stereolithography may be used to form complex structures, such as those shown in FIGS. 12A-13B and 15A-15B. Another suitable approach is to 3D print polymer structures and to deposit a metal or ceramic via atomic layer deposition, chemical vapor deposition, or electrodeposition on the polymer and then remove the polymer via chemical or plasma etching. Alternatively, etching methods can be used to etch structures into fused silica, or into silicon that can then be oxidized into silica. Growth methods can be used to fabricate nano- or micro-pillars 660, 760, such as those shown in FIGS. 10-11 and 15A-15B. The temperature-following layer 25* could also be sprayed onto the sealing layer 24, 24", if desired. Any other desirable method for forming the temperature-following layer 25* could be used.

Each of the bonding layer 20, the insulating layer 22, 22", the sealing layer 24, 24", 124, 224, 324, 424, 524, 624, 724, 824, 924, 1024, 1124, 1324, the temperature-following layer 25*, and the substrate 16, 16', 16" may have compatible coefficients of thermal expansion characteristics to withstand thermal fatigue.

It should be understood that any of the variations, examples, and features described with respect to one of the thermal barrier coatings 14, 14', 14" described herein may be applied to one of the other thermal barrier coatings 14, 14', 14" described herein.

The thermal barrier coatings 14, 14', 14" may be formed in any suitable way, which may include heating the insulating layer 22, 22", the bonding layer 20, the sealing layer 24, 24", and the temperature-following layer 25*, such as by sintering.

It should be appreciated that the thermal barrier coatings 14, 14', 14" described herein may be applied to components other than present within an internal combustion engine.

More specifically, the thermal barrier coatings 14, 14', 14" may be applied to components of space crafts, rockets, injection molds, and the like.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one example can be combined with one or a plurality of other desired characteristics from other examples, resulting in other examples not described in words or by reference to the drawings. Accordingly, such other examples fall within the framework of the scope of the appended claims.

What is claimed is:

1. A multi-layer thermal barrier coating comprising:
- an insulating layer;
- a sealing layer bonded to the insulating layer, the sealing layer being substantially non-permeable and sealing against the insulating layer; and
- a porous temperature-following layer disposed on the sealing layer, the porous temperature-following layer having an exposed edge, the porous temperature-following layer configured to follow a temperature of a gas adjacent to the exposed edge, the porous temperature-following layer being at least 90% porous,
- the porous temperature-following layer having a height not greater than 50 microns, the sealing layer having a height not greater than 50 microns, and the insulating layer having a height not greater than 250 microns, the sealing layer being no more than 10% porous.

2. The multi-layer thermal barrier coating of claim 1, the porous temperature-following layer being at least 98% porous.

3. The multi-layer thermal barrier coating of claim 2, the porous temperature-following layer being substantially comprised of nickel.

4. The multi-layer thermal barrier coating of claim 1, wherein the insulating layer comprises a ceramic material selected from the group consisting of: zirconia, stabilized zirconia, alumina, silica, rare earth aluminates, oxide perovskites, oxide spinels, and titanates.

5. The multi-layer thermal barrier coating of claim 1, the insulating layer comprising a plurality of hollow round microstructures bonded together.

6. The multi-layer thermal barrier coating of claim 1, the porous temperature-following layer comprising a plurality of hollow round microstructures bonded together, the plurality of hollow round microstructures being formed of at least one of a ceramic and a metal, each hollow round microstructure having an outer diameter in the range of 10 to 100 microns.

7. The multi-layer thermal barrier coating of claim 6, at least a portion of the hollow round microstructures each having an outer wall, the outer wall defining an opening therein, the opening being disposed on an outer side of the porous temperature-following layer.

8. The multi-layer thermal barrier coating of claim 6, each hollow round microstructure being porous.

9. The multi-layer thermal barrier coating of claim 1, the porous temperature-following layer comprising at least one of the following:
- a plurality of pillars having a height in the range of 10 to 100 microns, each pillar having a width in the range of 1/1000 to 1/20 of the height, each pillar being substantially straight along its height;
- a fibrous structure;
- a plurality of first pocket-forming structures forming a plurality of first pockets, the plurality of first pocket-forming structures defining open ends of the first pockets along an outer side of the temperature-following layer;
- an open cell honeycomb structure;
- a plurality of second pocket-forming structures defining gas-trapping second pockets, wherein the gas-trapping second pockets have open ends; and
- a plurality of third pocket-forming structures defining gas-trapping third pockets, wherein the gas-trapping third pockets have open ends, the third pocket-forming structures having portions forming outer walls over the gas-trapping third pockets.

10. A component comprising a metal substrate presenting a surface, and the multi-layer thermal barrier coating of claim 1 being bonded to the surface, the component being one of a piston crown and a valve face.

11. The multi-layer thermal barrier coating of claim 1, the porous temperature-following layer comprising a plurality of pillars having a height in the range of 10 to 100 microns, each pillar having a width in the range of 1/1000 to 1/20 of the height, each pillar being substantially straight along its height.

12. The multi-layer thermal barrier coating of claim 1, the porous temperature-following layer comprising a fibrous structure.

13. The multi-layer thermal barrier coating of claim 1, the porous temperature-following layer comprising a plurality of pocket-forming structures forming a plurality of pockets.

14. The multi-layer thermal barrier coating of claim 13, the plurality of pockets having open ends.

15. The multilayer thermal barrier coating of claim 14, the pocket-forming structures defining the open ends of the pockets along an outer side of the temperature-following layer.

16. The multilayer thermal barrier coating of claim 14, the pocket-forming structures having portions forming outer walls over a portion of the open ends.

17. The multi-layer thermal barrier coating of claim 1, the porous temperature-following layer comprising an open cell honeycomb structure.

* * * * *